(12) United States Patent
Decher et al.

(10) Patent No.: US 7,306,842 B2
(45) Date of Patent: Dec. 11, 2007

(54) USE OF MELAMINE RESIN FOILS AND OR FILMS FOR COATING THREE-DIMENSIONALLY STRUCTURED SURFACES AND OR MOULDED BODIES

(75) Inventors: Jakob Decher, Bobenheim-Roxheim (DE); Marta Martin-Portugues, Ludwigshafen (DE); Günter Scherr, Ludwigshafen (DE); Stephan Weinkötz, Lindenberg (DE); Klaus Fischer, Bad Berleburg (DE); Ralf A. Groβ, Bad Berleburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1 day.

(21) Appl. No.: 10/542,305

(22) PCT Filed: Jan. 10, 2004

(86) PCT No.: PCT/EP2004/000121

§ 371 (c)(1),
(2), (4) Date: Jul. 15, 2005

(87) PCT Pub. No.: WO2004/065484

PCT Pub. Date: Aug. 5, 2004

(65) Prior Publication Data

US 2006/0051606 A1  Mar. 9, 2006

(30) Foreign Application Priority Data

Jan. 17, 2003  (DE) ................................ 103 01 901

(51) Int. Cl.
*B32B 5/16* (2006.01)

(52) U.S. Cl. .................. 428/323; 428/327; 428/524; 428/526; 428/632

(58) Field of Classification Search ............ 428/323, 428/327, 524, 526, 532
See application file for complete search history.

(56) References Cited

U.S. PATENT DOCUMENTS

| | | | |
|---|---|---|---|
| 3,936,547 A | | 2/1976 | Schnee et al. |
| 4,016,366 A | | 4/1977 | Kurata |
| 5,306,783 A | * | 4/1994 | Kirchgaessner et al. .... 525/398 |
| 5,330,846 A | | 7/1994 | Eisele et al. |
| 5,670,572 A | | 9/1997 | Ott et al. |
| 6,551,702 B1 | * | 4/2003 | Biedermann et al. ....... 428/323 |
| 2001/0031825 A1 | | 10/2001 | Nasli-Bakir et al. |

FOREIGN PATENT DOCUMENTS

| | | | |
|---|---|---|---|
| DE | 2 309 334 | | 8/1974 |
| DE | 37 00 344 A1 | | 4/1988 |
| DE | 38 37 965 A1 | | 5/1990 |
| DE | 44 39 156 A1 | | 5/1996 |
| EP | 0 368 215 A1 | | 5/1990 |
| EP | 0368215 | * | 5/1990 |
| GB | 1 536 549 | | 12/1978 |

* cited by examiner

*Primary Examiner*—Leszek Kiliman
(74) *Attorney, Agent, or Firm*—Connolly Bove Lodge & Hutz LLP

(57) ABSTRACT

The present invention relates to the use for coating three-dimensionally structured surfaces and/or moldings of melamine resin sheets and/or films produced from cellulosic fiber materials post- or pre- and post-impregnated with an aqueous solution comprising
  (i) a melamine-formaldehyde condensate,
  (ii) an etherified melamine-formaldehyde condensate, and
  (iii) a polymer dispersion.

18 Claims, No Drawings

USE OF MELAMINE RESIN FOILS AND OR FILMS FOR COATING THREE-DIMENSIONALLY STRUCTURED SURFACES AND OR MOULDED BODIES

This application is a National Stage of PCT/EP2004/000121 filed Jan. 10, 2004 which in turn claims priority from German Application 103 01 901.4, filed Jan. 17, 2003.

The present invention relates to melamine resin sheets and/or films produced from cellulosic fiber materials post- or pre- and post-impregnated with an aqueous solution comprising
(i) a melamine-formaldehyde condensate,
(ii) an etherified melamine-formaldehyde condensate, and
(iii) a polymer dispersion for coating three-dimensionally structured surfaces and/or mouldings (3D coating). The invention further relates to specific aqueous synthetic resin mixtures.

For the 3D coating of materials it is usual to use thermoplastic sheets, in order for example to coat woodbase materials in the furniture industry. The significant advantage of these thermoplastic sheets to date has been their elasticity; disadvantages include the high production costs, caused inter alia by the additional use of adhesives, and the anticipated disposal costs. It would be desirable to use the self-adhesive inexpensive melamine resin films, used for example in the furniture industry to upgrade smooth surfaces, for coating three-dimensionally structured areas as well. Pure melamine resins are too brittle for this application. Improved flexibility has been achieved with melamine resins carrying etherified methylol groups in accordance with DE-A 23 09 334. These resins are used primarily to produce composites such as melamine resin sheets. To produce them, for example, papers, wovens or nonwovens are impregnated with the melamine resin and cured at temperatures from 100 to 180° C. These melamine resin films are used in particular to enhance the surface of woodbase materials such as particleboard, hardboard, and blackboard. For this purpose the melamine resin sheets are bonded to the faces or edges of the woodbase materials using an appropriate adhesive, with the application where appropriate of heat and pressure. The coating with melamine resin sheets is intended to improve the resistance of the woodbase materials to mechanical stresses and their water resistance.

To attain the elasticity and flexibility required to coat, for example, rounded edges the melamine resins have been modified: for example, by addition of guanamine as in DE-A 44 39 156 or by addition of small amounts of an aqueous synthetic resin dispersion as in DE-A 38 37 965. A combination of amino resins with acrylate dispersions is said by DE-A 37 00 344 to bring about a certain elasticity in the sheets produced. The patents described above disclose exclusively the production of what are termed soft edges. When the soft edges are coated with these melamine resin sheets there is a need, as described in the examples, for adhesives to fix the resin sheets to the edges.

As far as the property of deformability is concerned, the known melamine resin sheets are still in need of improvement. In particular there is a desire on the part of furniture manufacturers, for the uniform coating of surfaces with three-dimensional structures, such as are encountered, for example, in certain furniture styles (cottage-style furniture) and/or for the uniform coating of moldings, to be able to use melamine resin sheets or melamine resin films which as compared with their known counterparts have improved elasticity in conjunction with other properties which are at least equalled if not likewise improved. Furthermore there is a desire to be able to coat three-dimensional structures with sharp-edged elements two-dimensionally from one material. With preference 3D coating should be indicated for melamine resin films which are self-adhesive as a result of modification, which have to date been suitable only for the coating of smooth surfaces. On esthetic grounds and at the same time to simplify production the coating operation ought to take place in a single pressing operation. The principal feature of such sheets and films lies in their deformability during the pressing operation.

It is an object of the present invention to specify melamine resin sheets and/or films which are suitable for the two-dimensional coating of three-dimensionally structured surfaces, moldings, and three-dimensionally structured articles having sharp-edged elements and which nevertheless exhibit the usual quality features of a melamine resin sheet or film. The intention is further to provide a synthetic resin mixture which is suitable with particular advantage for impregnating cellulosic fiber materials in order to produce melamine resin films for 3D coating.

We have found that this object is achieved by the use of melamine resin sheets and/or films produced from cellulosic fiber materials or wovens post- or pre- and post-impregnated with an aqueous solution comprising
(i) a melamine-formaldehyde condensate,
(ii) an etherified melamine-formaldehyde condensate and
(iii) a polymer dispersion for coating three-dimensionally structured surfaces and/or moldings (3D coating).

It has been found that aqueous solutions are particularly suitable for post-impregnating or pre- and post-impregnating the cellulosic fiber materials if said solutions comprise
(i) from 5 to 50% by weight, in particular from 10 to 30% by weight, of a melamine-formaldehyde condensation product,
(ii) from 5 to 50% by weight, in particular from 10 to 40% by weight, of an etherified melamine-formaldehyde condensation product, and
(iii) from 20 to 90% by weight, in particular from 30 to 80% by weight, of a polymer dispersion.

The amounts of components (i), (ii) and (iii) add up to 100% by weight and are based on the liquid resin mixture.

The melamine resin mixture of the invention may also have auxiliaries and additives added to it, examples being from 0.1 to 50% by weight, preferably from 0.2 to 30% by weight, in particular from 0.5 to 20% by weight of urea, caprolactam, phenyidiglycol, butanediol and/or sucrose, based on 100% by weight of the mixture of (i) to (iii). It may further comprise customary additives such as wetting agents, curatives, and catalysts, for example.

Also found have been new synthetic resin mixtures suitable with particular advantage for producing melamine resin films and sheets for 3D coating. The composition of such mixtures is as follows:
(i) from 5 to 50% by weight, in particular from 10 to 20% by weight, of a melamine-formaldehyde condensation product,
(ii) from 5 to 50% by weight, in particular from 10 to 30% by weight, of an etherified melamine-formaldehyde condensation product, and
(iii) from 40 to 90% by weight, in particular from 50 to 80% by weight, of a copolymer in aqueous dispersion form which is crosslinkable by condensation reaction and is a copolymer of acrylates containing preferably carboxyl, hydroxyl, amide, glycidyl, carbonyl, N-methylol, N-alkoxymethyl, amino and/or hydrazo groups.

The amounts of components (i), (ii) and (iii) add up to 100% by weight and are based on the liquid resin mixture.

There now follow details of the individual synthesis components: Melamine-formaldehyde condensation products are used as synthesis component (i). The preparation of synthesis component (i) is common knowledge. Generally first 1 mol of melamine is condensed with from 1.4 to 2 mol of formaldehyde at a pH of from 7 to 9 and at a temperature of from 40 to 100° C. until the appropriate degree of condensation is reached.

In synthesis component (ii) melamine-formaldehyde condensation products are etherified with $C_1$ to $C_4$ alkanols such as methanol, ethanol, propanol and/or butanol. Methanol and ethanol are preferred. The preparation of synthesis component (ii) is common knowledge. The melamine-formaldehyde condensation product is typically admixed with from 20 to 30 mol of methanol and etherified at a pH of from 1 to 5 and at a temperature of from 40 to 80° C. The condensation conditions are governed by the water dilutability desired for the resin, which is at least 1:6. Following condensation the melamine resins are freed from excess alcohol and formaldehyde by distillation. Any remaining formaldehyde is converted with the addition of urea at temperatures from room temperature to 90° C., preferably from 60 to 70° C.

As synthesis component (iii) use is made of copolymer dispersions whose copolymers contain preferably carboxyl, hydroxyl, amide, glycidyl, carbonyl, N-methylol, N-alkoxymethyl, amino and/or hydrazo groups. These functional groups in the copolymer are obtained in conventional manner by copolymerization of corresponding monomers which carry these functional groups.

The copolymers contain the abovementioned functional groups generally in an amount such that said copolymers may contain in copolymerized form from 0.1 to 50, preferably from 0.3 to 20% by weight, based on the copolymer, of these monomers containing functional groups.

Suitable principal monomers for the comonomers containing the abovementioned groups include the customary, olefinically unsaturated monomers that are copolymerizable with said comonomers, examples being $C_1$ to $C_{12}$ alkyl esters of acrylic acid and methacrylic acid, preferably $C_1$ to $C_8$ alkyl esters, e.g., methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, and lauryl methacrylate; vinyl esters of $C_2$ to $C_4$ carboxylic acids, e.g., vinyl acetate and vinyl propionate, $C_1$ to $C_4$ dialkyl esters of maleic acid and fumaric acid, vinylaromatics such as styrene, α-methylstyrene, and vinyltoluene; acrylonitrile, methacrylonitrile, acrylamide, methacrylamide, and also vinyl ethers having 3 to 10 carbon atoms, vinyl halides such as vinyl chloride and vinylidene chloride; polyolefinically unsaturated compounds such as butadiene and isoprene, and mixtures of the abovementioned monomers, provided they are copolymerizable with one another.

For preparing the synthetic resin mixture it is usual to adjust the pH of the polymer dispersion to from 7.5 to 10 before adding the other components.

Without detriment to its other qualities, the melamine resin sheet and/or film used in accordance with the invention has the required high elasticity needed for the coating of three-dimensionally structured surfaces and/or moldings and/or structured articles having sharp-edged elements. By sharp-edged elements are meant, inter alia, edges, angles and points which describe a defined angle produced by two or more planes which meet one another.

The melamine resin sheets or films for use in accordance with the invention are produced in conventional manner using absorbent cellulosic fiber materials or wovens or decorative paper.

The cellulosic fiber materials are pre-impregnated with the melamine resin mixture (i) to (iii) of the invention or with a melamine-formaldehyde impregnating resin or with a mixture of melamine-formaldehyde impregnating resins and coating resins or with a mixture of urea-formaldehyde resins and melamine-urea-formaldehyde resins. From 25 to 85 parts by weight of melamine resin mixture are used per 100 parts by weight, based on the solids content of the melamine resin mixture. The impregnated fiber materials are subsequently cured to melamine resin sheets or melamine resin films in conventional manner, e.g., in a stream of hot air at temperatures from 140 to 200° C. The melamine resin sheets or melamine resin films are processed further by post-impregnating them with the melamine resin mixture (i) to (iii) and bonding them adhesively to the material component with the three-dimensionally structured surface that is to be coated, the adhesive bonding operating being carried out with heat and pressure where appropriate. Preferred materials are woodbase materials, e.g., cottage-style furniture, and oriented strand board (OSB). Adhesive bonding takes place preferably two-dimensionally in a single workstep, i.e., the three-dimensionally structured surface is coated with a single melamine resin film or sheet, which projects over the entire structure, in a single pressing operation.

For the purposes of this invention a melamine resin sheet is a non-self-adhesive sheet while a melamine resin film is a self-adhesive film.

The surfaces obtained are clearly and effectively closed, with good deformabilities.

The advantages of the invention also lie in the avoidance of costs for the costly and inconvenient production and disposal of the thermoplastic sheets used to date.

EXAMPLES

Component (i): Melamine-Formaldehyde Condensation Product

Kauramin impregnating resin 753 from BASF Aktiengesellschaft, comprising an aqueous solution of a modified melamine-formaldehyde condensation product (modifier: butanediol)

Component (ii): Etherified Melamine-Formaldehyde Condensation Product 126 g of melamine were methylolated in the presence of 270 g of formaldehyde at a pH of 8.5 and at temperatures from 40 to 70° C. The resulting addition compound was adjusted to a pH of 4 using formic acid and was etherified with 900 g of methanol at temperatures of 60° C. for a period of 15 minutes. Following neutralization with sodium hydroxide solution the reaction solution was freed by concentration (distillation) from the unreacted formaldehyde and from the excess methanol.

Component (iii): Polymer Dispersion

Luhydran® S 937 T from BASF Aktiengesellschaft, a copolymer comprising an aqueous, hydroxyl-containing dispersion of a copolymer based on acrylic and methacrylic esters and also styrene

Example 1

20 g of component (i), 30 g of component (ii), and 40 g of component (iii) were mixed at a pH of from 7 to 9 and at a temperature of from 20 to 30° C. The resulting synthetic resin mixture was storage-stable for at least 24 hours.

Use Example

Decorative paper with a basis weight of 80 g/m² was preimpregnated with component (i) (70% resin application based on the paper weight). The synthetic resin mixture from Example 1 was admixed with 0.5% by weight of curative, based on the synthetic resin mixture (e.g. Härter 529 Flüssig [curative 529, liquid] from BASF Aktiengesellschaft), then applied to the preimpregnated decorative paper by knife-coating and subsequently dried, so that the decorative papers had a solids content of from 120 to 130% and possessed a residual moisture content of from 6 to 10%.

Comparative Example

Using component (i), following the addition of 0.5% by weight of curative based on component (i) (e.g., Härter 529 Flüssig from BASF Aktiengesellschaft), decorative paper with a weight of 80 g/m² was impregnated and dried so that the decorative papers had a solids content in the full impregnation of from 120 to 130% and possessed a residual moisture content of from 6 to 10%.

3D Coating and Characterization:

The resulting melamine resin film was pressed onto an MDF (Medium Density Fiber) board with a diameter of 16.5 cm, comprising a 3D structure. By 3D structures are meant contours with round and straight areas and/or edges with a defined angle. The pressing operation took place in a laboratory press at from 150 to 160° C. under a force of 45 kN and in a time of 30-60 s.

The deformability and the adhesion of the melamine resin film to the MDF board comprising a 3D structure were assessed. For good deformability the coating should conform fully to the structure and adhere firmly to it without tearing or breaking.

Characterization of the Surface:

The resulting melamine resin film was pressed onto an MDF board at a temperature of 160-165° C. under a pressure of 25 Kp and in a time of 110 s. The following tests were conducted:

Curing:

The quality of curing was determined by allowing 0.2N hydrochloric acid stained with 0.004% by weight of Rhodamin B solution to act on the coated MDF board for 16 hours. Curing is effective if the surface is not attacked by the acid. The extent of the attack can be assessed on the basis of the extent of reddening.

Assessment:
0=no attack
1=weak pink coloration
2=distinct reddening
3=severe reddening
4=severe reddening with slight surface swelling
5=severe reddening with severe surface swelling
6=destroyed surface Imperviousness:

The imperviousness or porosity of the coated surface serves for assessing the dirt sensitivity. Black shoe polish was rubbed into the surface under test and then removed again with a cloth. The shoe polish remaining in the pores allows the imperviousness of the surfaces to be assessed.

The assessment of the surface imperviousness is made in the following stages:
0=pore-free
1=isolated pores
2=few pores
3=many pores
4=large number of open areas
5=very large number of open areas
6=no imperviousness Blackness:

The blackness measurement was conducted in accordance with D 3265 using a Tint Tester 527 with Tint Sensor lightness measuring head. The measurement range spans 0-99.99 lightness units, with zero being the lowest lightness stage (absolute black). Distinct graying is recognizable even at values >0.8.

After the instrument had been calibrated with a standard, the test specimen was subjected to measurement three times and the blackness reported as the mean value.

The results are presented in Table 1.

TABLE 1

| | Appearance | Curing | Imperviousness | Blackness |
|---|---|---|---|---|
| Comparative example | Paper tore at sharp points | 2 | 4 | 0.58 |
| Example 1 | Paper covered 3D surface fully | 2 | 2 | 0.67 |

We claim:

1. An article comprising three-dimensionally structured surfaces and/or moldings (3D coating) and a coating thereon of melamine resin sheets and/or films produced from cellulosic fiber materials post- or pre- and post-impregnated with an aqueous solution comprising
    (i) a melamine-formaldehyde condensate,
    (ii) an etherified melamine-formaldehyde condensate, and
    (iii) a polymer dispersion,
wherein the dispersion (iii) comprises a copolymer of acrylates comprising carboxyl, hydroxyl, amide, glycidyl, carbonyl, N-methylol, N-alkoxymethyl, amino and/or hydrazo groups.

2. The article as claimed in claim 1, wherein the aqueous solution comprises
    (i) from 5 to 50% by weight of a melamine-formaldehyde condensation product,
    (ii) from 5 to 50% by weight of an etherified melamine-formaldehyde condensate, and
    (iii) from 20 to 90% by weight of a polymer dispersion, the amounts of components (i), (ii) and (iii) adding up to 100% by weight and being based on the liquid resin mixture.

3. The article as claimed in claim 1, wherein the aqueous solution further comprises from 0.1 to 50% by weight of urea based on 100% by weight of the mixture of (i) to (iii).

4. The article as claimed in claim 1, wherein the aqueous solution comprises
    (i) from 10 to 30% by weight of a melamine-formaldehyde condensation product,
    (ii) from 10 to 40% by weight of an etherified melamine-formaldehyde condensation product, and
    (iii) from 30 to 80% by weight of a polymer dispersion, the amounts of components (i), (ii) and (iii) adding up to 100% by weight and being based on the liquid resin mixture.

5. The article as claimed in claim 1 for coating articles having 3D surfaces and/or sharp-edged elements.

6. The article as claimed in claim 1 for coating with a single melamine resin sheet and/or film.

7. The article as claimed in claim 1 for coating woodbase materials.

8. The article as claimed in claim 1 for coating oriented strand boards (OSB).

9. The article as claimed in claim 1, wherein the cellulosic fiber materials are pre-impregnated with melamine-formaldehyde impregnating resins or with a mixture of melamine-formaldehyde impregnating resins and coating resins or with a mixture of urea-formaldehyde resins and melamine-urea-formaldehyde resins and post-impregnated with said aqueous solution of (i) to (iii).

10. A synthetic resin mixture for impregnating cellulosic fiber materials, comprising
  (i) from 5 to 50% by weight of a melamine-formaldehyde condensation product,
  (ii) from 5 to 50% by weight of an etherified melamine-formaldehyde condensation product, and
  (iii) from 40 to 90% by weight of a copolymer of acrylates comprising carboxyl, hydroxyl, amide, glycidyl, carbonyl, N-methylol, N-alkoxymethyl, amino and/or hydrazo groups in aqueous dispersion form which is crosslinkable by condensation reaction, the amounts of components (i), (ii) and (iii) adding up to 100% by weight and being based on the liquid resin mixture.

11. A melamine resin sheet or film impregnated with a synthetic resin mixture as claimed in claim 10.

12. A method of 3D coating which comprises applying a melamine resin sheet and/or film as claimed in claim 11 two-dimensionally in one operation to the three-dimensional structure of a material.

13. A method of 3D coating which comprises producing melamine resin sheets and/or films from cellulosic fiber materials post- or pre- and post-impregnated with the aqueous solution of claim land applying them to the three-dimensionally structured surface and/or molding to be coated.

14. The article as claimed in claim 2, wherein the dispersion (iii) comprises copolymers of acrylates comprising carboxyl, hydroxyl, amide, glycidyl, carbonyl, N-methylol, N-alkoxymethyl, amino and/or hydrazo groups.

15. The article as claimed in claim 2, wherein the aqueous solution further comprises from 0.1 to 50% by weight of urea based on 100% by weight of the mixture of (i) to (iii).

16. The article as claimed in claim 1, wherein the aqueous solution further comprises from 0.1 to 50% by weight of urea based on 100% by weight of the mixture of (i) to (iii).

17. The article as claimed in claim 2, wherein the aqueous solution comprises
  (i) from 10 to 30% by weight of a melamine-formaldehyde condensation product,
  (ii) from 10 to 40% by weight of an etherified melamine-formaldehyde condensation product, and
  (iii) from 30 to 80% by weight of a polymer dispersion, the amounts of components (i), (ii) and (iii) adding up to 100% by weight and being based on the liquid resin mixture.

18. The article as claimed in claim 1, wherein the aqueous solution comprises
  (i) from 10 to 30% by weight of a melamine-formaldehyde condensation product,
  (ii) from 10 to 40% by weight of an etherified melamine-formaldehyde condensation product, and
  (iii) from 30 to 80% by weight of a polymer dispersion, the amounts of components (i), (ii) and (iii) adding up to 100% by weight and being based on the liquid resin mixture.

* * * * *